United States Patent Office.

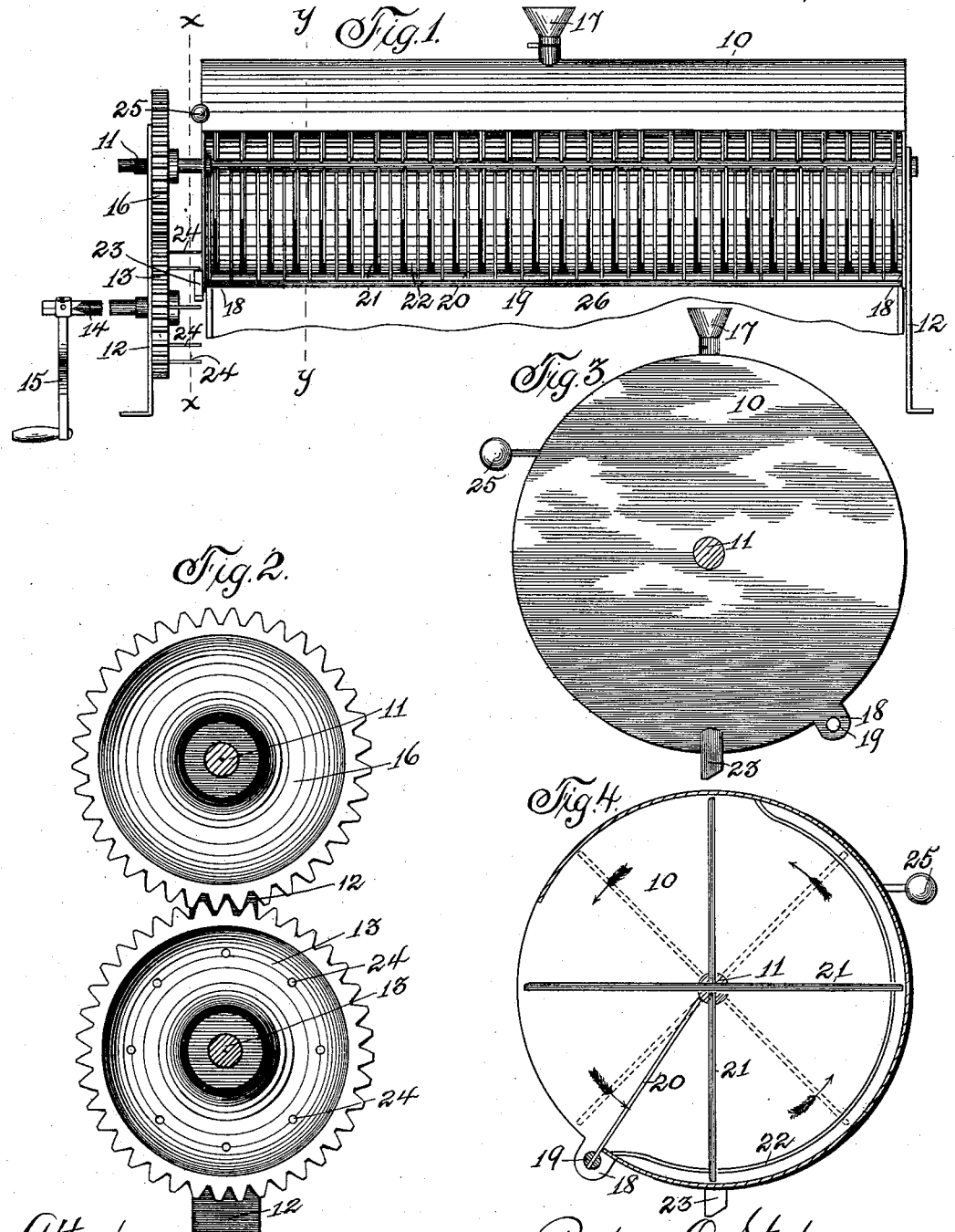

REUBEN O. STUTSMAN, OF DES MOINES, IOWA.

APPARATUS FOR POPPING CORN.

SPECIFICATION forming part of Letters Patent No. 605,617, dated June 14, 1898.

Application filed November 14, 1891. Serial No. 411,957. (No model.)

*To all whom it may concern:*

Be it known that I, REUBEN O. STUTSMAN, a citizen of the United States, and a resident of Des Moines, in the county of Polk and State of Iowa, have invented a certain new and useful Apparatus for Popping Corn, of which the following is a specification.

The object of my invention is to provide means by which the kernels of that character of corn known as "pop-corn" may be readily placed and held within a containing-receptacle, subjected therein to the influence of heat, and agitated in such a manner as that the whole extent of surface of each of the kernels is brought within the influence and subjected to the action of the heat, separating and dividing out those kernels of the corn which have been popped in the continued operation of the machine, and finally ejecting said corn, which has been so separated, from the containing-receptacle, permitting the unpopped corn to remain within said receptacle until fully and completely treated by the heat.

A further object of my invention is to provide mechanism for accomplishing the above-desired results actuated from one point of operation, simple in character, compact and cheap in point of construction, and effective in its operation.

My invention consists in the construction of an apparatus for popping corn, comprising a receptacle having an opening or slot in one side thereof and mechanism connecting with said receptacle, whereby the corn within the receptacle is agitated and stirred to aid in the operation of popping, and which mechanism also effects a separation of the popped kernels of corn from those kernels which are unpopped and removes the former from the receptacle through the said slot or opening.

My invention consists, further, in an apparatus for popping corn, comprising a receptacle within which the kernels of corn are subjected to the influence of heat, a revolving rake mounted within said receptacle, and means for revolving said rake, whereby the popped kernels of corn may be separated automatically from the kernels which are unpopped during the operation of popping.

My invention consists, further, in the combination, with a containing-compartment having a slot or opening in one side thereof and a rake rotatably mounted within said compartment, of a frame within which said compartment is pivotally mounted, together with revolving mechanism, which periodically acts upon the said compartment and oscillates the same.

My invention consists, further, in the details of construction and combination of parts hereinafter clearly set forth, pointed out in my claims, and illustrated by the accompanying drawings, in which—

Figure 1 is a side view of the apparatus. Fig. 2 is a transverse sectional view on the line X X of Fig. 1, showing the operating mechanism. Fig. 3 is an end view of the corn-containing compartment, the operating mechanism being removed. Fig. 4 is a transverse sectional view on the line Y Y of Fig. 1, the dotted lines showing a varying position of the revolving rake.

In the construction of the device as shown the numeral 10 designates a containing-receptacle having a slot or opening in the forward side thereof. This containing-receptacle is cylindrical in form and is rotatably mounted at its center upon a shaft 11, which shaft is rotatably journaled in the supports 12 12, located at either end of the apparatus. A spur-wheel 13 is rigidly mounted upon the inner end of a shaft 14, which latter is rotatably journaled in the lower portion of one of the supports 12. A crank 15 is mounted upon the outer end of the shaft 14, by means of which crank the said shaft and the spur-wheel 13 are rotated.

It is apparent that a spring-motor or any other constant automatic motive power may be substituted for the manually-operated crank 15.

A gear-wheel 16 is rigidly mounted on the shaft 11 and meshes with the spur-wheel 13.

A hopper 17 is mounted about a perforation or opening near the central portion of the top of the containing-receptacle 10, through which hopper the corn to be popped is introduced within the said receptacle.

Ears 18 18 are formed on and project below the periphery of the receptacle 10, and a clearer-head 19 is mounted therein and extends longitudinally across the said receptacle, at the lower side of the opening in said receptacle. Clearer-teeth 20 are fixed to the clearer-head 19 and extend upward therefrom in an inclined position within the receptacle 10, the upper end of said clearer-teeth resting against the shaft 11. Rake-teeth 21 are radially disposed upon said shaft 11 and extend outward therefrom, the outer ends of said teeth being in proximity to the inner surface of the receptacle.

Slats 22 are fixed to the inside of the receptacle 10 in the position shown in Fig. 4, said slats being separated a distance approximately equal to twice the diameter of the rake-teeth 21, thus forming slots, within which the outer end portions of the said rake-teeth travel during the revolution of the shaft 11.

An abutment 23 is fixed to the outside of the receptacle 10, adjacent to the spur-wheel 13, which abutment is engaged intermittently and periodically during the revolution of the said spur-wheel by the pins 24, which project from the inner face of said spur-wheel.

A weighted arm 25, fixed to the outer end of the receptacle 10, causes the said receptacle to resume its normal position after each engagement of the pins 24 with the abutment 23.

The numeral 26 designates a portion of an apron which may be made to terminate in or lead into a hopper or other receptacle for the popped corn.

The operation of my improved apparatus is as follows: The corn to be popped is fed into the receptacle 10 through the hopper 17 and rests upon the slats within said receptacle, which said receptacle and slats may be heated in any desired manner. The spur-wheel 13 is then rotated in the direction indicated by the arrows in Fig. 2, thus causing the pins 24, Figs. 1 and 2, to engage the abutment 23 successively and intermittently, and owing to the pivotal mounting of the receptacle upon the shaft 11 said engagement will cause an intermittent movement of rotation or partial rotation on the part of the receptacle in a direction opposite to the movement of rotation of the spur-wheel. Upon the passage of each of the pins engaging the abutment out of engagement with said abutment the weighted arm 25 will aid the receptacle in assuming its normal position, the weight normally tending to cause the receptacle to move in a direction opposite to the impetus imparted by the pins. The gear-wheel 16 being rigidly mounted upon the shaft 11 and meshing with the spur-wheel 13, it is obvious that the said shaft 11 and the rake-teeth 21, secured thereto, will have a movement of rotation coincident with the said gear-wheel, and the said rake-teeth traveling through and among the mass of kernels within the receptacle will also agitate and stir the said kernels, thus aiding and assisting the heat in performing the operation of popping by presenting all surfaces of the kernels to the heating-point. The said rake-teeth 21 are separated from each other by such distances as to permit the unobstructed passage of the said teeth through the mass of approximately dry unpopped corn without lifting or conveying away any of said corn; but when the kernels of corn pop they become considerably enlarged, their surfaces are irregular and of a somewhat gummy consistency, and obstructing the free passage of the rake-teeth through the mass they are necessarily gathered up by said teeth and conveyed upward and around the interior of the receptacle to a point beyond a vertical plane of the shaft 11, at which time the major portion of the kernels so carried fall vertically upon the clearer-teeth 20 and sliding along the same are conveyed outside the receptacle. Such kernels of corn as may adhere to the rake-teeth 21 are removed therefrom by engagement with the clearer-teeth 20 in the further traverse of the said rake-teeth. The rake-teeth being in close proximity to the inner surface of the containing-receptacle and the popped kernels of corn being, as stated, of a somewhat gummy consistency, it sometimes occurs that portions of the popped corn become wedged between the ends of said teeth and the wall of the receptacle, thus impeding the rotary movement of the mechanism and causing the receptacle to revolve coincident with the shaft 11 and defeating the object to be attained. To avoid such an occurrence, I have arranged the slats 22 upon the interior of the receptacle in such a manner as to prevent any part or portion of the kernels of corn within the receptacle from contacting with or in any manner obstructing the free traverse of the outermost ends of the said rake-teeth.

It will be observed that owing to the arrangement of the parts as shown and described the corn to be treated may be fed constantly to and within the receptacle during the operation of popping and that the popped grains are immediately separated out and removed automatically after having been sufficiently treated by the heat.

Owing to the fact that the opening or slot in the side of the receptacle extends the entire length thereof the operation of gathering the popped corn and conveying it to the exterior of the receptacle is greatly simplified and facilitated, and I do not desire to be understood as limiting myself to any particular form of mechanism or arrangement of parts by which the corn is agitated, stirred, divided out, or removed, as it is apparent that the object to be obtained is such a dividing out or removal of the popped corn through an opening or openings at the side or sides of the receptacle, and numerous devices might be illustrated by which approximately the same result could be attained.

I desire to be understood whenever the term "side" or "sides" is employed in the specification and claims that the same refers to any portion of the surface of the cylindrical containing-receptacle other than the ends of the same and is employed to designate all of that portion of said receptacle which is contradistinguished from the ends. It is to be further understood whenever the word "acting" is used in the claims that the same is employed to designate merely the performance of a function or the production of an effect without reference to capability of movement.

Having thus described my invention, what I claim as new therein, and desire to secure by Letters Patent of the United States therefor, is—

1. An apparatus for popping corn, comprising a containing-receptacle into which kernels of corn to be treated are deposited which receptacle is rotatably mounted, means for rotating said receptacle, said receptacle having an opening or openings in the side which is parallel to the axis of the same and separating and discharging mechanism, whereby the popped corn is automatically removed from the receptacle through the said opening or openings and in advance of the said separating and discharging mechanism, the unpopped corn remaining within the receptacle.

2. An apparatus for popping corn, comprising a cylindrical containing vessel having an opening in the side thereof conveying mechanism rotatably mounted within said receptacle, clearing mechanism connected to and extending within said receptacle, and means for rotating said conveying mechanism in order that the popped corn may be separated out from the mass within the receptacle caused to fall upon the clearing mechanism and discharged through the said opening.

3. In an apparatus for popping corn, the combination with a pivotally-mounted cylindrical containing-receptacle having a discharge-opening in one side thereof, of a revolving rake rotatably mounted concentrically within said receptacle, clearing mechanism connected to said receptacle and acted upon by the rake-teeth to clear the same, conjunctively-operating gear-wheels for rotating the rake and means for causing one of said gear-wheels to oscillate the receptacle.

4. In an apparatus for popping corn, the combination with a corn-containing receptacle and means of ingress thereto and egress therefrom, of a revolving rake concentrically mounted within said receptacle, and means for rotating said rake, and a plurality of slats fixed to the interior of said receptacle at slight differences of separation the teeth of the rake traveling in the spaces between said slats, whereby the ends of the rake-teeth are prevented from contacting with the corn.

5. An apparatus for popping corn, comprising a containing-receptacle pivotally mounted upon a suitable support and having means of ingress thereto and egress therefrom, a rake rotatably mounted concentrically within said receptacle, a train of gearing connected to and operating said rake, pins fixed to and projecting from one of the members of said gearing, which pins in their traverse successively engage with and impart a rotary motion to the said receptacle, and means for causing said receptacle to resume its normal position after each contact of the several pins.

In testimony whereof I have hereunto affixed my signature in the presence of two witnesses.

REUBEN O. STUTSMAN.

Witnesses:
C. C. BULKLEY,
J. C. SWEET.